US009260131B2

(12) United States Patent
Wilkes et al.

(10) Patent No.: US 9,260,131 B2
(45) Date of Patent: Feb. 16, 2016

(54) STEERING COLUMN ASSEMBLY

(75) Inventors: Mark Anthony Wilkes, Birmingham (GB); Niclas Davies, Birmingham (GB)

(73) Assignee: TRW Limited, West Midlands (GB)

( * ) Notice: Subject to any disclaimer, the term of this patent is extended or adjusted under 35 U.S.C. 154(b) by 0 days.

(21) Appl. No.: 14/129,319

(22) PCT Filed: Jun. 26, 2012

(86) PCT No.: PCT/GB2012/051487
§ 371 (c)(1),
(2), (4) Date: Apr. 7, 2014

(87) PCT Pub. No.: WO2013/001284
PCT Pub. Date: Jan. 3, 2013

(65) Prior Publication Data
US 2014/0208884 A1 Jul. 31, 2014

(30) Foreign Application Priority Data
Jun. 28, 2011 (GB) .................................. 1110930.3

(51) Int. Cl.
*B62D 1/187* (2006.01)
*F16B 7/14* (2006.01)
*B62D 1/184* (2006.01)

(52) U.S. Cl.
CPC ................ *B62D 1/187* (2013.01); *B62D 1/184* (2013.01); *F16B 7/1427* (2013.01)

(58) Field of Classification Search
CPC ........ B62D 1/184; B62D 1/185; B62D 1/187; B60R 2011/001; F16B 7/14; F16B 7/1427
USPC .................................................. 74/493, 497
See application file for complete search history.

(56) References Cited

U.S. PATENT DOCUMENTS 8,342,574 B2 * 1/2013 Bahr et al. ..................... 280/775
8,413,541 B2 * 4/2013 Davies et al. ................... 74/493
(Continued)

FOREIGN PATENT DOCUMENTS

| EP | 1747966 A2 | 1/2007 |
| EP | 1795425 A2 | 6/2007 |
| JP | 2008307959 A | 12/2008 |

OTHER PUBLICATIONS

Intellectual Search Report for GB 1110930.3 dated Oct. 13, 2011.
(Continued)

*Primary Examiner* — Paul N Dickson
*Assistant Examiner* — Timothy Wilhelm
(74) *Attorney, Agent, or Firm* — MacMillan, Sobanski & Todd, LLC

(57) ABSTRACT

A steering column assembly comprises an adjustable shroud which at least partially surrounds a steering shaft and a clamp mechanism operable between a clamped position in which the adjustable shroud part is locked in position and an unclamped position in which the adjustable shroud part can be moved to set the reach and/or rake of the steering column assembly, in which the clamp mechanism comprises a clamp pin, a locking handle and a cam mechanism fitted to the clamp pin, in which the cam mechanism comprises first and second cam portions which can be moved relative to each other by operation of the locking handle to vary the overall length of the cam mechanism, the unclamped position of the cam mechanism being defined by contact of a first end stop of the first cam portion with a second end stop of the second cam portion. At least one of the end stops comprises a resilient cushioning element which provides cushioning as the at least one end stop engages the other end stop upon the clamp mechanism reaching the unclamped position.

7 Claims, 2 Drawing Sheets

(56) References Cited

U.S. PATENT DOCUMENTS

| | | | |
|---|---|---|---|
| 8,590,932 B2* | 11/2013 | Dietz et al. | 280/775 |
| 2006/0225530 A1 | 10/2006 | Hirooka | |
| 2010/0139438 A1* | 6/2010 | Appleyard et al. | 74/493 |
| 2013/0319163 A1* | 12/2013 | Davies et al. | 74/493 |
| 2014/0305251 A1* | 10/2014 | Wilkes et al. | 74/493 |

OTHER PUBLICATIONS

International Search Report for PCT/GB2012/051487 dated Nov. 29, 2012.

* cited by examiner

STEERING COLUMN ASSEMBLY

CROSS-REFERENCE TO RELATED APPLICATIONS

This application is a national stage of International Application No. PCT/GB2012/051487 filed Jun. 26, 2012, the disclosures of which are incorporated herein by reference in entirety, and which claimed priority to Great Britain Patent Application No. GB 1110930.3 filed Jun. 28, 2011, the disclosures of which are incorporated herein by reference in entirety.

BACKGROUND OF THE INVENTION

This invention relates to improvements in steering column assemblies.

It is known to provide a steering column assembly. The assembly can be adjusted for reach allowing the steering wheel to be moved towards and away from a driver, or for rake allowing the steering wheel to be moved upwards and downwards relative to the driver. This allows for a comfortable driving position to be achieved and, where provided, for the optimum positioning of a driver airbag attached to the steering wheel relative to the torso of the driver. A steering column that adjusts for reach or rake is known as a single adjust assembly, and one that adjusts for both is known as a double adjust assembly.

It is important that the assembly is easy to adjust when required and yet fixed rigidly in position when the vehicle is being driven. This is achieved by providing a steering column shroud which surrounds a steering column shaft that supports the steering wheel. The shroud is fixed in position by a releasable clamp assembly. When the clamp assembly is in a clamped condition the shroud, and the wheel, are fixed relative to a part of the vehicle, typically the bulkhead. When it is in an unclamped position the shroud is free to move relative to the bulkhead so that the position of the wheel can be adjusted.

Several clamp assemblies are known, but a most common type includes a clamp mechanism which can be released or locked by rotation of a handle attached to a clamp pin or bolt. The handle is fixed to a first part of a cam mechanism which rotates with the handle about the axis of the clamp pin or bolt. A second part of the cam mechanism is prevented from rotating and co-operates with the first part. Rotating the handle moves the two cam parts relative to each other, which increases or decrease the overall length of the cam mechanism depending on which way the handle is rotated. This change in length of the cam mechanism provides the locking function of the clamp assembly.

BRIEF SUMMARY OF THE INVENTION

According to a first aspect the invention provides a steering column assembly comprising an adjustable shroud which at least partially surround a steering shaft and a clamp mechanism operable between a clamped position in which the adjustable shroud is locked in position and an unclamped position in which the adjustable shroud can be moved to set at least one of the reach and the rake of the steering column assembly, in which the clamp mechanism comprises a clamp pin, a locking handle and a cam mechanism fitted to the clamp pin, in which the cam mechanism comprises first and second cam portions which can be moved relative to each other by operation of the locking handle to vary the overall length of the cam mechanism, the unclamped position of the cam mechanism being defined by contact of a first end stop of the first cam portion with a second end stop of the second cam portion, characterised in that at least one of the end stops comprises a resilient cushioning element which provides cushioning as the at least one end stop engages the other end stop upon the clamp mechanism reaching the unclamped position.

The applicant has appreciated that providing a resilient cushioning element as part of the end stop or the part of the other cam part can reduce the noise that would otherwise occur as the cam reaches the fully open position.

The resilient cushioning element may comprise a rubber or other relatively soft material element, whereas the first and second cam parts may comprise sintered metal components. It may be releasable from the rest of the end stop or integrally formed, perhaps by being moulded in place. It may even be possible in some arrangements for the whole of the end stop to be a resilient cushioning element. By element we may mean one single part or a collection of parts.

The first end stop most preferably may comprise a protrusion of the first cam portion and the cushioning element may comprise an O-ring which is a fitted over the protrusion. It may be a simple push fit over the protrusion. A groove may be provided on the end stop to help securely locate the O-ring. The second end stop may comprise a face of the second cam portion. The first cam portion is preferably of sintered metal and the protrusion is preferably an integral part of the sintered metal cam portion.

Use of an O-ring over a protrusion is a simple, low cost, solution because O-rings are readily available and because it can be easily replaced if required, for instance if it becomes worn over time.

The second cam portion may be a moving cam portion which rotates with the clamp pin as the handle is operated and the first cam portion may comprise a fixed cam portion which is restrained so that it cannot rotate.

One of the cam portions may include a cam and the other of the cam portions a cam follower which moves over the cam as the handle rotates to change the length of the cam mechanism.

Other advantages of this invention will become apparent to those skilled in the art from the following detailed description of the preferred embodiments, when read in light of the accompanying drawings.

DETAILED DESCRIPTION OF THE INVENTION

Figure 1:
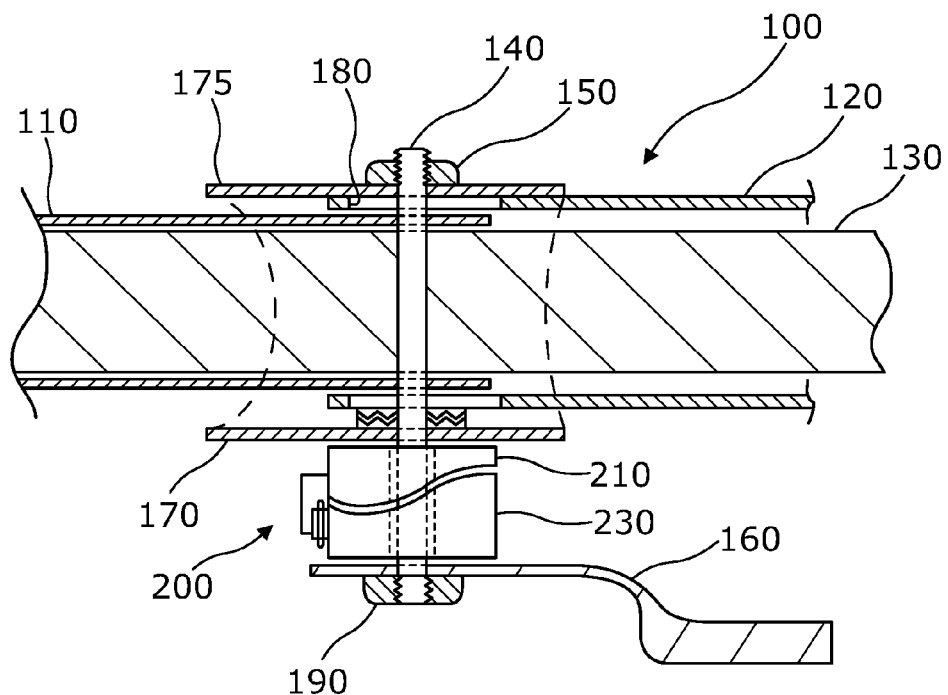
FIG. 1 is a cross sectional view of a part of an embodiment of a steering column assembly.

As shown in FIG. 1 a steering column assembly 100 comprises an adjustable shroud which as shown comprises a fixed shroud part 110 and a moving shroud part 120 which surround a steering shaft 130. The moving shroud part 110 fits telescopically around the fixed part 120. One end of the shaft 130 supports a steering wheel (not shown) and the other is connected through a steering mechanism (also not shown) to roadwheels of the vehicle. This mechanism may comprise an electric power assistance motor. A clamp mechanism connects the fixed shroud part 100 to the moving shroud part 120. This comprises a clamp pin 140 which passes through spaced apart openings in the fixed part and the moving part. A nut 150 is provided on one end of the pin and a locking handle 160 on the other. The handle is retained by an adjustable nut 190 that is threaded to the end of the clamp pin 140. The handle 160 includes a grip sized so that it can be comfortably griped by a driver of the vehicle. A cam mechanism 200 is located on the pin between the locking handle 160 and the moving shroud part 120, which is sized so that it cannot pass through the opening in the moving shroud part 120. The pin 140 also passes through openings two spaced apart arms 170, 175 of a clamp bracket that is fixed to the vehicle bulkhead (not shown).

As will become apparent the locking handle 160 can be rotated to clamp and unclamp the clamp mechanism and doing so changes the overall length of the cam mechanism 200. At its greatest length the clamp mechanism is in a clamped condition and the moving and fixed shroud parts are squeezed together so they cannot move. At its shortest length the shroud parts are unsqueezed and free to move, constrained by the dimensions of the opening in the moving shroud part. As shown the opening 180 is elongate along the axis of the steering shaft so that the overall length of the steering column assembly can be adjusted for reach.

Figure 2:
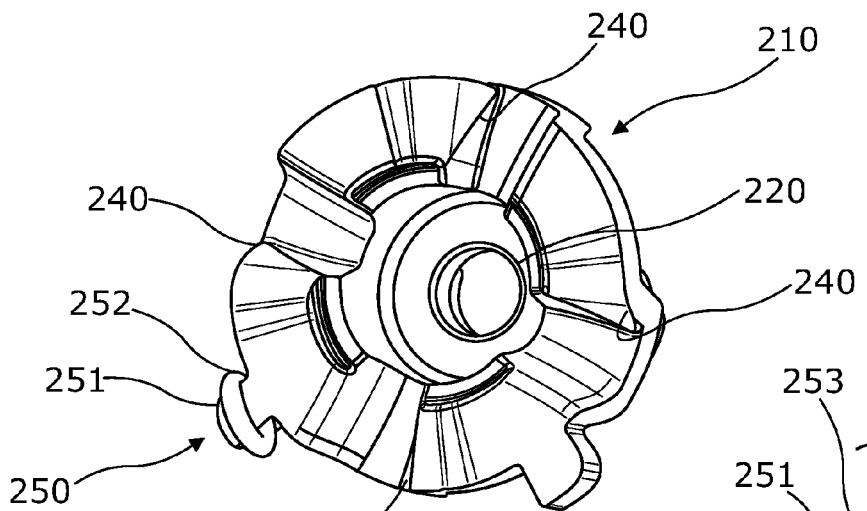
FIG. 2 is perspective view of the fixed cam portion of the assembly of FIG. 1 prior to installation.
Figure 5:
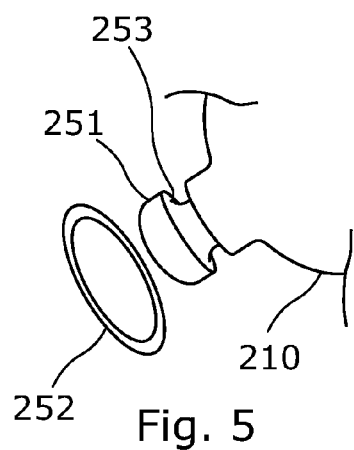
FIG. 5 is an exploded view of a detail of the fixed cam portion of FIG. 3 showing the first end stop.

The cam mechanism comprises a fixed cam portion 210 of sintered metal that is restrained against rotation by engagement with the arm 170 of the clamp bracket. The fixed cam part can be seen most clearly in FIG. 2 and FIG. 5 of the drawings. The clamp pin 140 passes through a hole 220 in the centre of the fixed cam portion. The cam mechanism also includes a moving cam portion 230, also of sintered metal, and which is also fitted to the clamp pin 140. This is fixed so that it rotates with the handle by fixing it to the clamp pin and permitting the clamp pin 140 to rotate with the handle 160. The fixed cam part 210 has a cam surface 240 which faces and engages a cam follower formed on the moving cam part. As the moving part rotates relative to the fixed cam part 210 the cam follower moves along the cam surface, and this causes the overall width of the cam mechanism to vary (as measured in a direction parallel to the axis of the clamp pin). As shown there are in fact four equispaced cam surfaces 240 on the fixed part and four equispaced cam followers on the second cam portion 230.

Figure 3:
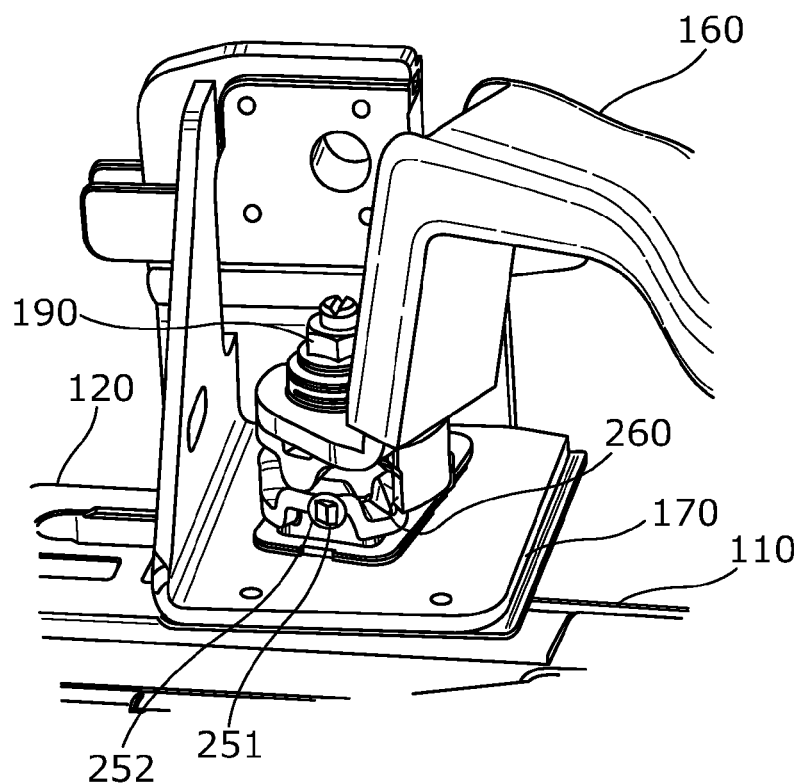
FIG. 3 is a perspective view of the assembly in use in a fully unclamped condition.

In use the driver can operate the handle to clamp and unclamp the steering column assembly. As seen in FIG. 3, to move the clamp assembly from the unclamped to the clamped position, the handle 160 is rotated by the driver. As it reaches the fully clamped position it will become progressively harder to turn as the cam mechanism, clamp bracket arms and moving and fixed shroud portions are squeezed together between the nut 150 and the cam mechanism 200. On the other hand, as the handle 160 is turned to move the assembly from the clamped to the unclamped condition it will get easier to turn. This often leads to the handle 160 being moved to the fully unclamped position at great speed.

Figure 4:
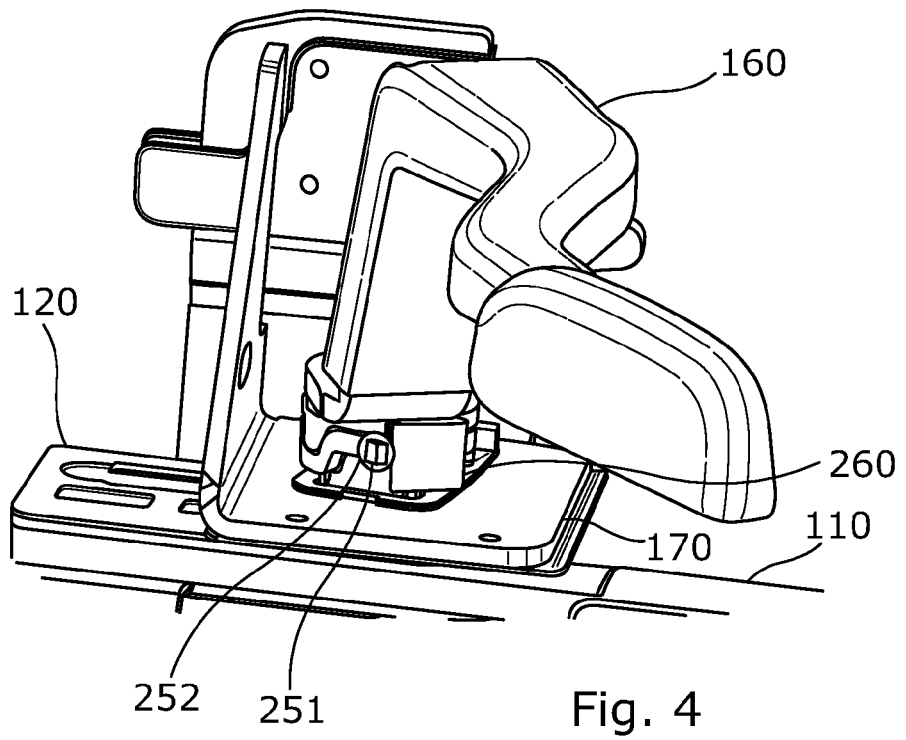
FIG. 4 is a perspective view of the assembly in use in fully clamped condition.

To define the fully unclamped position, which is shown in FIG. 4, the fixed cam portion 210 is provided with a first end stop 250, and the moving cam portion is provided with a second end stop 260, the two end stops 250, 260 coming into contact when the unclamped position is reached and preventing any further rotation of the locking handle in that unclamp direction. The first end stop 250 comprises a protrusion 251 and a resilient cushioning element 252 that comprises a rubber O-ring that is securely located in a groove 253 around the protrusion 251. This can be seen in FIG. 5 of the drawings. This soft element contacts the second end stop.

Providing the soft O-ring 252 provides cushioning when the clamp mechanism rapidly reaches the fully unclamped position, considerably reducing any noise that would otherwise occur as the first end stop 250 strikes the second end stop 260.

The skilled person will appreciate that various modifications are possible within the scope of the invention, in particular to the configuration of the clamp mechanism. The clamp mechanism may be configured so that an increase in the overall length of the cam mechanism unclamps the assembly rather than clamps it, and the way in which the clamping is achieved can be varied. Furthermore, although the resilient cushioning element is shown as an O ring which forms part of the fixed cam portion it could form part of the moving cam portion. It could also, in some embodiments, be moulded into the end stop, or indeed the whole end stop may be a resilient cushioning element.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

The invention claimed is:

1. A steering column assembly comprising an adjustable shroud which at least partially surrounds a steering shaft and a clamp mechanism operable between a clamped position in which the adjustable shroud is locked in position and an unclamped position in which the adjustable shroud can be moved to set at least one of a reach and rake of the steering column assembly, in which the clamp mechanism comprises a clamp pin, a locking handle and a cam mechanism fitted to the clamp pin, in which the cam mechanism comprises a first cam portion and a second cam portion which can be moved relative to each other by operation of the locking handle to vary an overall length of the cam mechanism, the unclamped position of the cam mechanism being defined by contact of a first end stop of the first cam portion with a second end stop of the second cam portion, wherein at least one of the first and second end stops carries a separate resilient cushioning element which provides cushioning to reduce noise as the at least one of the first and second end stops engages the other one of the first and second end stops upon the clamp mechanism reaching the unclamped position.

2. The steering column assembly according to claim 1 in which the resilient cushioning element comprises a rubber element.

3. The steering column assembly according to claim 1 in which the first end stop comprises a protrusion of the first cam portion.

4. The steering column assembly according to claim 3 in which the cushioning element comprises an O-ring which is fitted over the protrusion.

5. The steering column assembly according to claim 4 which includes a groove on the end stop which locates the O-ring.

6. The steering column assembly according to claim 1 in which the second cam portion comprises a moving cam portion which rotates with the clamp pin as the handle is operated and the first cam portion comprises a fixed cam portion which is restrained so that it cannot rotate.

7. The steering column assembly according to claim 1 in which one of the first and second cam portions includes a cam and the other of the first and second cam portions includes a cam follower which moves over the cam as the handle rotates to change the length of the cam mechanism.

* * * * *